Figure 1:
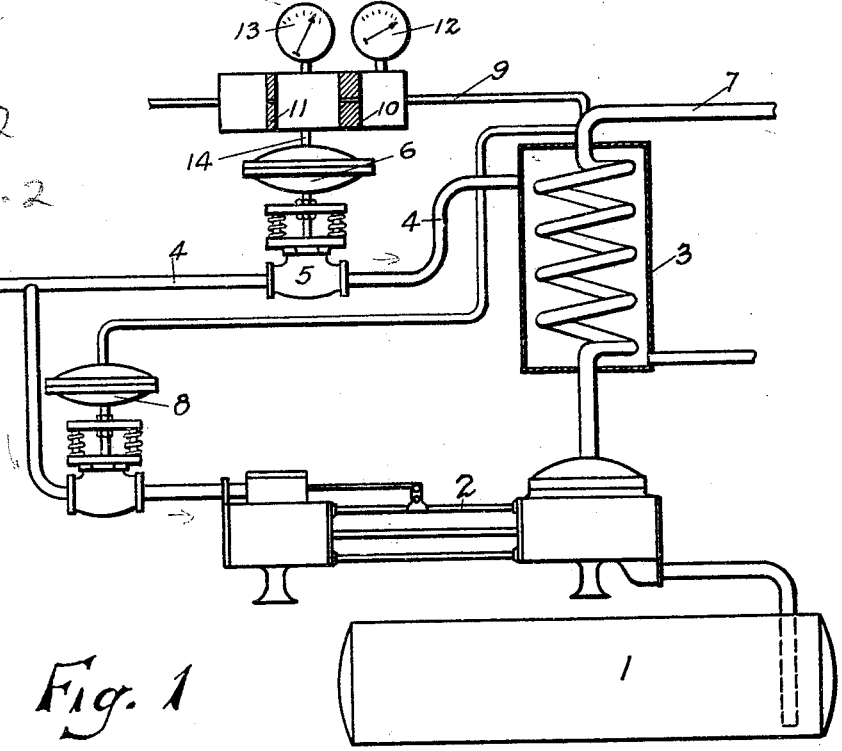

Oct. 4, 1932.  J. P. LEASK ET AL  1,881,200

METHOD OF AND APPARATUS FOR THE REGULATION OF VISCOSITY OF LIQUIDS

Filed Sept. 10, 1928

INVENTORS.
John P. Leask
Samuel J. Cramer
BY
Meyers & Jones
their ATTORNEYS.

Patented Oct. 4, 1932

1,881,200

UNITED STATES PATENT OFFICE

JOHN P. LEASK, OF GLENBROOK, CONNECTICUT, AND SAMUEL T. WARNER, OF NEW YORK, N. Y., ASSIGNORS TO PEABODY ENGINEERING CORPORATION, A CORPORATION OF NEW YORK

METHOD OF AND APPARATUS FOR THE REGULATION OF VISCOSITY OF LIQUIDS

Application filed September 10, 1928. Serial No. 305,068.

Our invention relates to methods of and apparatus for regulating and measuring the viscosity of liquids, or mixtures of liquids, and more particularly to maintaining the viscosity of liquids substantially constant. The present application is filed as a continuation in part of our application Serial No. 719,452, filed June 11, 1924.

In certain processes it is desirable to maintain a liquid at a given viscosity, or one within narrow limits, to facilitate its proper handling, as in the process of spray-drying of molasses, or the burning of oil, or similar arts. Control of the temperature of the liquids provides a ready means for accomplishing this, since all liquids possess certain definite temperature-viscosity characteristics.

Heretofore it has been necessary to take a small sample of liquid which is to be used and subject it to a laboratory test to determine the exact temperature at which the liquid must be maintained in order to give it the desired viscosity. Having thus determined the proper temperature for the specific liquid in question, the quantity of the liquid which is actually to be used is passed through a heater and the amount of heat regulated so as always to maintain the temperature at the point determined in the laboratory. If, however, some change occurs in the liquid so that a change in the temperature, that is, some other temperature, is required to bring it to the desired viscosity, an entirely new laboratory test is necessary in order to determine what this new temperature must be. The supply of heating medium is then altered to maintain the liquid at this new temperature. It often happens, however, that some change in the liquid takes place without the knowledge of the operator of the system. For example, it may happen that at the bottom of the storage tank there may have accumulated a liquid of heavy viscous character, which will be pumped through the system without warning, or, a different sort of liquid may have been delivered to the storage tank unknown to the operator. It thus happens that repeated and frequent laboratory tests to determine temperature and viscosity of the liquid, are necessary, or else the liquid will be heated to the wrong temperature due to inadequate information as to its character.

One of the objects of the present invention is the elimination of this trial and error method. This is accomplished by establishing a method which will automatically indicate and regulate the viscosity of a liquid regardless of whatever changes in temperature may occur or be required in the liquid itself. The invention to accomplish this result is based upon the fact that a change in the temperature of a liquid effects a corresponding change in its viscosity, and of the further fact that as viscosity is the resistance offered by a liquid to the relative motion of its particles, its pressure drop, when flowing through a restriction, varies with its viscosity. Generally stated, the present method consists in passing a liquid through a device which will give a drop in pressure in accordance with its viscosity, and utilizing any variation in the drop in pressure to regulate the amount of heat supplied to the liquid. The restriction may be of any form such as an orifice in a disc, a Venturi tube or a long pipe, or any other device which will accomplish the same purpose.

A further object of the invention is to utilize the pressure differential to regulate the heat supplied to the liquid to maintain its viscosity substantially constant at any predetermined degree suitable for the purpose required.

Figure 2:
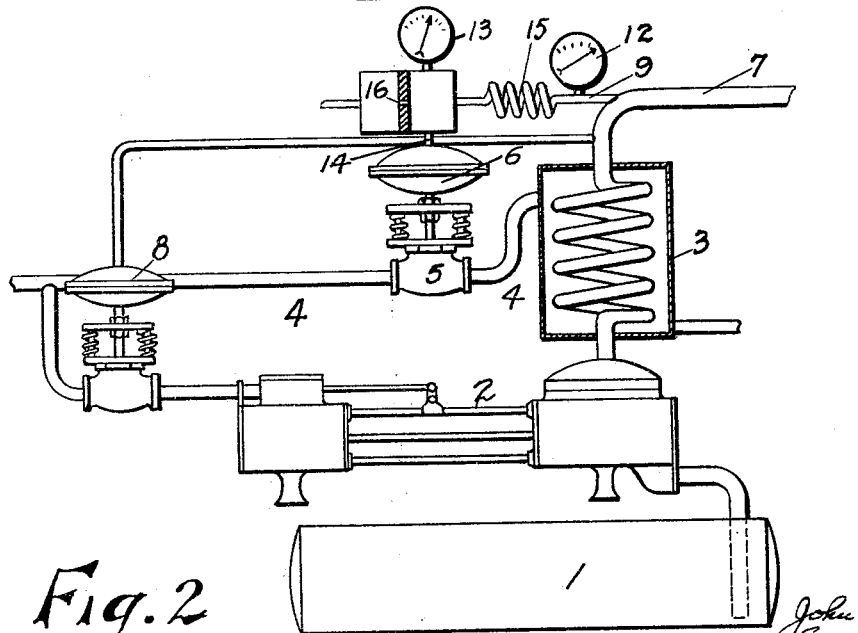

The invention will be understood by reference to the following description taken in connection with the accompanying drawing of which Figs. 1 and 2 are diagrammatic layouts of systems which may be employed.

Referring to Fig. 1, the numeral 1 designates a storage tank from which the liquid is withdrawn by pump 2 and delivered through a heater 3, of any suitable type, which may be supplied with a heating medium, preferably steam, through a pipe 4 having a valve 5 controlled by a pressure regulator 6. After leaving the heater the liquid passes through pipe 7 to its point of use. The pump 2 is controlled by a pump governor 8 of the ordinary type designed so that the liquid will leave the heater 3 at a constant pressure. At the outlet of the heater there is a pipe 9 through which a small portion of the liquid is delivered under a constant head to a device wherein a pressure differential is produced which varies with the viscosity of the liquid. As shown in Fig. 1, this comprises a pair of restrictions 10 and 11, which may take any suitable form provided that a difference in pressure, due to changes in viscosity, is obtained between the two sides of the restriction. On one side of the restriction shown is a pressure gauge 12, and on the other side a similar gauge 13. The pressure differential will be indicated by the difference between the readings of the two gauges. A pipe 14 leads from this device to the pressure regulator 6, whereby the pressure on the side of the restriction away from the pump will effect a movement of the regulator to vary the opening of valve 5 to admit more or less of the heating medium through pipe 4.

As the quantity of liquid withdrawn through pipe 9 is preferably small compared with that delivered through pipe 7, it may be conveniently disposed of by returning it to tank 1, or it may be delivered to any other storage tank, or otherwise disposed of as may be desired.

It is one object of our invention to maintain the viscosity of the liquid at a desired predetermined constant, within narrow limits. This we accomplish in the following manner which we shall describe in connection with the use of the apparatus in an oil burning system.

The pump 2 delivers the oil to pipe 7 leading to the burners. A portion of this oil is withdrawn through pipe 9 and passed through the restrictions 10 and 11 under a constant head where a drop in pressure occurs. This pressure differential is at once an indication of the viscosity of the liquid for the reason that every different degree of viscosity will cause, in any particular instrument, some one definite drop in pressure and no other. Change in pressure drop indicates change in viscosity. At the desired predetermined viscosity, the drop in pressure will always be the same, and the device will be adjusted to provide a certain setting of the valve 5. As long as the viscosity of the oils remains substantially unchanged, the pressure drop will remain constant, and the valve 5 will not be moved, and the amount of steam supplied to heater 3 will not vary.

Should the viscosity of the oil increase above the predetermined degree, the increase in the drop in pressure, caused by the increase in viscosity, becomes effective through pipe 14 to act upon the regulator 6 to open the valve 5 to admit more steam to the heater. The resultant increase in temperature will cause a decrease in viscosity and the pressure differential resulting from such decrease will act to partly close valve 5 and to restore it to its normal position.

Should the viscosity of the oil delivered through pipe 9 fall below the predetermined degree, the change in the drop in pressure below the normal will effect a closing movement of the valve 5 with a corresponding decrease in the amount of steam admitted through pipe 4.

From the foregoing it will be seen that our invention contemplates the supply of an amount of heat which will reduce the liquid to a viscosity suitable for the purpose for which it is to be used. So long as the viscosity remains substantially constant, the drop in pressure, as the liquid is forced through restrictions 10 and 11 under a constant head, will also remain constant and no change will be effected in the amount of heat supplied to the heater. It is the change in the drop in pressure caused by the change in viscosity which is utilized by us. This will be understood by assuming that under a constant head of, say, 60 lbs., and a viscosity of 180 Saybolt seconds, the drop in pressure across the restriction 10 may be taken as 30 lbs. Should the viscosity increase to, say, 185 Saybolt seconds, the drop in pressure may be, say, 31 lbs. It is this difference in the terminal pressure of one pound which is utilized to operate the pressure regulator 6 and partly open valve 5. Vice versa, should the viscosity become 175 Saybolt seconds, the drop in pressure may become 29 lbs. and the valve 5 will be partly closed, this again being due to the change in pressure from 30 to 29 lbs. If the pressure drop is lowered or increased then the valve 5 will be moved to increase or decrease the supply of steam to the heater, and thus tend to bring the viscosity of the liquid back to the desired point.

The foregoing illustration is based on a design in which the restrictions 10 and 11 are so arranged as to cause an increase in drop in pressure when there is an increase in viscosity. The restrictions 10 and 11 may be arranged, however, so as to obtain a decrease in the pressure drop by an increase in viscosity. As it is the change in the pressure drop occasioned by change in viscosity which actuates the pressure regulator 6, it is obvious that the device will function no matter whether an increase or decrease in the pressure drop results from an increase in viscosity.

In the apparatus illustrated in Fig. 2, the restrictions are in the form of a small tube 15 and an orifice 16. The remainder of the structure and operation thereof corresponds to Fig. 1. It is to be understood that so far as the method is concerned, any form of restriction may be employed with either manual or automatic control. The precise character of heaters, pumps, and regulators, etc., is immaterial, and they have been merely illustrated diagrammatically. Other variations can be made without departing from the spirit of the invention.

It is also to be understood that the precise arrangement of tank, pump, heater, etc., in relation to each other is not essential to the proper carrying out of the invention. For example, the heater 3 may be eliminated and the heat applied directly to the tank by a heating coil in the tank or by the application of flame from a gas or oil burner directly to the exterior of the tank. In either of these cases, the intensity of the heat may be controlled by the valve 5.

It is also obvious that gauges 12 and 13 may be used merely to indicate the viscosity of the liquid flowing through the device. The control of the supply of heating medium may then be adjusted by hand so that the proper viscosity may be maintained. In this case the pressure regulator 6 will be omitted.

What we claim is:

1. The method of controlling the viscosity of a liquid which consists in passing only a portion thereof through a device wherein is produced a pressure which varies with the viscosity of the liquid, and utilizing the variations in pressure to regulate the temperature and viscosity of the liquid.

2. The method of controlling the viscosity of a liquid which consists in heating the liquid, passing only a portion thereof through a device which will give a pressure varying in accordance with the viscosity of the liquid, and regulating the amount of heat supplied to the liquid by the variations in the pressure.

3. The method of controlling the temperature of a liquid which consists in heating the liquid, passing only a portion thereof through a device wherein a pressure is produced which varies with the viscosity of the liquid, and causing any variation of the viscosity of the liquid passing through said device to act to vary the temperature of the liquid.

4. A viscosity regulator for liquids comprising means for heating the liquid, a device for producing a pressure in accordance with the viscosity of the liquid, means for forcing only a portion of the liquid through said device, and means for utilizing the pressure to regulate the amount of heat supplied to the liquid.

5. A viscosity regulator comprising a source of liquid supply, means for supplying a heating medium for the liquid, a device wherein a pressure is produced which varies with the viscosity of the liquid, means for passing only a portion of the liquid through said device, and means responsive to the pressure of the liquid at a point beyond said device for regulating the amount of heat supplied to the liquid.

6. The method of regulating the viscosity of a liquid which consists in passing it through a heater, then passing part of the liquid through a restricted passage, then causing the bypassed liquid to act against a balancing resistance to effect changes in the supply of heat to the heater to bring the viscosity back to normal.

7. The method of regulating the viscosity of a liquid which consists in passing it through a heater and from thence at least a part of the liquid through a restricted conduit to reduce the pressure of the liquid in proportion to its viscosity, then causing the liquid to act against a balancing force to control the supply of heat to the heater.

8. The method of regulating the viscosity of fuel oil, which consists in passing the oil through a heater and from thence at least part of the oil through a viscosity-responsive device to vary its pressure in proportion to its viscosity and then causing the variable pressure of the oil to act against a balancing force to control the supply of heat to the heater.

9. A viscosity regulator for oil burning systems comprising, in combination, means for supplying fuel oil, a heater for the oil, means sensitive to changes in viscosity of oil leaving the heater, and means controlled by said sensitive means for regulating the supply of heat to the heater.

10. The method of controlling the viscosity of a liquid including the steps of withdrawing the liquid from a point of supply, then passing it through a zone in which its viscosity may be changed, thereafter passing a part of it through a device sensitive to viscosity wherein the viscosity of the liquid is represented and thence passing the other part to a point of use which is separated from the point of supply and in utilizing the device which is sensitive to viscosity for controlling the viscosity of the liquid passing through the zone in which the viscosity of the liquid may be changed.

Signed at New York in the county of New York and State of New York this 7th day of September, A. D. 1928.

JOHN P. LEASK.

Signed at New York in the county of New York and State of New York this 7th day of September, A. D. 1928.

SAMUEL T. WARNER.